(12) United States Patent
Joh et al.

(10) Patent No.: US 11,722,708 B2
(45) Date of Patent: Aug. 8, 2023

(54) DISPLAY DEVICE AND OPERATING METHOD THEREFOR

(71) Applicant: SAMSUNG ELECTRONICS CO., LTD., Suwon-si (KR)

(72) Inventors: Jongmyoung Joh, Suwon-si (KR); Taeung Jung, Suwon-si (KR)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 0 days.

(21) Appl. No.: 17/290,551

(22) PCT Filed: Nov. 20, 2019

(86) PCT No.: PCT/KR2019/015928
§ 371 (c)(1),
(2) Date: Apr. 30, 2021

(87) PCT Pub. No.: WO2020/106056
PCT Pub. Date: May 28, 2020

(65) Prior Publication Data
US 2022/0014803 A1    Jan. 13, 2022

(30) Foreign Application Priority Data

Nov. 20, 2018 (KR) ........................ 10-2018-0143901

(51) Int. Cl.
*H04N 21/234* (2011.01)
*H04N 21/233* (2011.01)
*H04N 21/439* (2011.01)

(52) U.S. Cl.
CPC ..... *H04N 21/23418* (2013.01); *H04N 21/233* (2013.01); *H04N 21/4394* (2013.01)

(58) Field of Classification Search
CPC ........... H04N 21/23418; H04N 21/233; H04N 21/4394; H04N 21/278; H04N 21/44008;
(Continued)

(56) References Cited

U.S. PATENT DOCUMENTS 10,142,679 B2   11/2018   Koh
10,375,440 B2    8/2019   Jang et al.
(Continued)

FOREIGN PATENT DOCUMENTS

EP              2 763 427 B1    1/2018
KR       10-2015-0104422 A      9/2015
(Continued)

OTHER PUBLICATIONS

International Search Report (PCT/ISA/210) and Written Opinion (PCT/ISA/237) dated Mar. 2, 2020 by the International Searching Authority in International Patent Application No. PCT/KR2019/015928.

*Primary Examiner* — Adil Ocak
(74) *Attorney, Agent, or Firm* — Sughrue Mion, PLLC (57) ABSTRACT

Provided is a display device including: a display; a communicator; a memory storing one or more instructions; and a processor configured to execute the one or more instructions stored in the memory, to perform control to extract a video fingerprint from current content being displayed on the display, transmit the extracted video fingerprint to a server, receive, from the server, a first response comprising a matching result of the extracted video fingerprint and video fingerprints stored in the server, extract an audio fingerprint from the current content being displayed on the display in case that the extracted video fingerprint matches a plurality of video fingerprints stored in the server according to the first response, transmit the extracted audio fingerprint to the server, and receive, from the server, a second response comprising a matching result of the extracted audio fingerprint and audio fingerprints stored in the server.

9 Claims, 7 Drawing Sheets

(58) Field of Classification Search
CPC ........... H04N 21/4622; H04N 21/4722; H04N 21/6547; H04N 21/6581; H04N 21/8547; H04N 21/8133; H04N 21/4307; G06F 16/73

See application file for complete search history.

(56) References Cited

U.S. PATENT DOCUMENTS

| | | | |
|---|---|---|---|
| 10,972,786 B2 | 4/2021 | Lee et al. | |
| 11,151,185 B2* | 10/2021 | Yeo | H04N 21/8358 |
| 2015/0199351 A1* | 7/2015 | Borenstein | G06F 16/783 |
| | | | 707/740 |
| 2017/0171609 A1* | 6/2017 | Koh | H04N 21/44008 |
| 2017/0251249 A1* | 8/2017 | Seo | H04H 60/58 |
| 2018/0109841 A1 | 4/2018 | Seo et al. | |
| 2019/0018846 A1 | 1/2019 | Yeo et al. | |

FOREIGN PATENT DOCUMENTS

| | | | | |
|---|---|---|---|---|
| KR | 10-2017-0069057 A | 6/2017 | | |
| KR | 10-2017-0077730 A | 7/2017 | | |
| KR | 10-2018-0105751 A | 9/2018 | | |
| WO | 2013/047948 A1 | 4/2013 | | |
| WO | 2017/116052 A1 | 7/2017 | | |
| WO | WO-2017116052 A1 * | 7/2017 | ............. | G06F 16/41 |

\* cited by examiner

DISPLAY DEVICE AND OPERATING METHOD THEREFOR

TECHNICAL FIELD

Various embodiments of the present disclosure relate to a display device and an operating method therefor and, more specifically, to a display device for obtaining information about content by using video fingerprints and audio fingerprints of the content, and an operating method therefor.

BACKGROUND ART

A display device is a device having a function of displaying an image viewable by a user. A user may view a broadcast through a display device. The display device may display, on a display, a broadcast selected by the user among broadcast signals transmitted from a broadcasting station. In addition, the display device may receive various multimedia content items through network communication, such as through the Internet, and display the received content items on the display.

The display device may obtain identification information of content displayed on the display and information related to the content by using fingerprinting. The content may be identified by extracting video fingerprints or audio fingerprints from the content and matching the extracted fingerprints to fingerprints prestored in a server.

Meanwhile, if a plurality of content items have the same video frames but different audio frames, it may be difficult to identify the content items by only video fingerprint matching, whereas, if they have different video frames, the content items may be identified by only video fingerprint matching.

DESCRIPTION OF EMBODIMENTS

Solution to Problem

Various embodiments of the present disclosure provide a display device capable of reducing the amount of resources used to obtain information about content by extracting an audio fingerprint from the content based on whether a video fingerprint extracted from the content is multi-matched, and an operating method therefor.

BEST MODE

According to some embodiments, a display device includes: a display; a communicator; a memory storing one or more instructions; and a processor configured to execute the one or more instructions stored in the memory, to perform control to extract a video fingerprint from current content being displayed on the display, transmit the extracted video fingerprint to a server, receive, from the server, a first response comprising a matching result of the extracted video fingerprint and video fingerprints stored in the server, extract an audio fingerprint from the current content being displayed on the display in case that the extracted video fingerprint matches a plurality of video fingerprints stored in the server according to the first response, transmit the extracted audio fingerprint to the server, and receive, from the server, a second response comprising a matching result of the extracted audio fingerprint and audio fingerprints stored in the server.

According to some embodiments, the second response may comprise a matching result of the extracted audio fingerprint and each of audio fingerprints corresponding to a plurality of content items corresponding to the plurality of video fingerprints that match the extracted video fingerprint, among audio fingerprints stored in the server.

According to some embodiments, the first response may comprise information about a content item corresponding to at least one video fingerprint that matches the extracted video fingerprint, and the second response may comprise information about a content item corresponding to a combination of the plurality of video fingerprints that match the extracted video fingerprint, and an audio fingerprint that matches the extract audio fingerprint.

According to some embodiments, the display device may extract the video fingerprint and the audio fingerprint from the current content being displayed on the display at preset time intervals, extract an audio fingerprint from the current content being displayed on the display, at preset time intervals, in case that the extracted video fingerprint matches the plurality of video fingerprints stored in the server according to the first response, and stop the extraction of an audio fingerprint in case that the extracted video fingerprint matches one video fingerprint stored in the server.

According to some embodiments, the first response may comprise information about a time period, among time periods constituting the extracted video fingerprint, in which the extracted video fingerprint matches the plurality of video fingerprints stored in the server, and the processor may be further configured to execute the one or more instructions stored in the memory, to extract, based on the first response, the audio fingerprint from the current content being displayed on the display, with respect to the time period in which the extracted video fingerprint matches the plurality of video fingerprints.

According to an embodiment, an operating method of a display device includes: extracting a video fingerprint from current content being displayed on a display of the display device; transmitting the extracted video fingerprint to a server; receiving, from the server, a first response comprising a matching result of the extracted video fingerprint and video fingerprints stored in the server; extracting an audio fingerprint from the current content being displayed on the display in case that the extracted video fingerprint matches a plurality of video fingerprints stored in the server according to the first response; transmitting the extracted audio fingerprint to the server; and receive, from the server, a second response comprising a matching result of the extracted audio fingerprint and audio fingerprints stored in the server.

According to some embodiments, a computer program product includes a computer-readable recording medium having a computer readable program stored therein, wherein the computer readable program, when executed on a display device, causes the display device to: extract a video fingerprint from current content being displayed on a display of the display device; transmit the extracted video fingerprint to a server; receive, from the server, a first response comprising a matching result of the extracted video fingerprint and video fingerprints stored in the server; extract an audio fingerprint from the current content being displayed on the display in case that the extracted video fingerprint matches a plurality of video fingerprints stored in the server according to the first response; transmit the extracted audio fingerprint to the server; and receive, from the server, a second response comprising a matching result of the extracted audio fingerprint and audio fingerprints stored in the server.

MODE OF DISCLOSURE

The terms used in the disclosure are selected from currently widely used general terms in consideration of functions of the disclosure, but may vary according to the intentions or practices of those of skill in the art or the advent of new technology. In addition, terms arbitrarily selected by the applicant are used in specific case, and in this case, its meaning will be described in the corresponding description of the present disclosure. Accordingly, the terms used in this specification should be interpreted on the basis of substantial implications that the terms have and the contents across this specification not the simple names of the terms.

Throughout the present specification, when a portion may 'include' a certain constituent element, unless specified otherwise, it may not be construed to exclude another constituent element but may be construed to further include other constituent elements. Terms such as "unit", "module", or the like denote units that process at least one function or operation, and they may be implemented by using hardware, software, or a combination of hardware and software.

Hereinafter, embodiments of the present disclosure will now be described in detail with reference to the accompanying drawings for one of skill in the art to be able to perform the present disclosure without any difficulty. The present disclosure may, however, be embodied in many different forms and should not be construed as being limited to the embodiments of the present disclosure set forth herein. In order to clearly describe the present disclosure, portions that are not relevant to the description of the present disclosure are omitted, and similar reference numerals are assigned to similar elements throughout the present specification.

Throughout the present disclosure, the term "user" refers to a person who controls a function or an operation of an image display device by using a control device, and may include a viewer, an administrator, or an installation engineer.

Throughout the present disclosure, the term "content" may refer to various types of multimedia content such as broadcast content, advertisement content, movie content, video on demand (VOD) content, or the like. Content consists of an audio signal and/or video signal. The audio signal constituting the content may be divided into preset time units called frames and processed, and the video signal constituting the content may also be divided into preset unit pictures also called frames and processed. Therefore, in one frame, an audio signal and/or a video signal regarding a certain content part are included.

Hereinafter, a concept of an operating method of a display device will be described with reference to FIG. 1.

Figure 1:
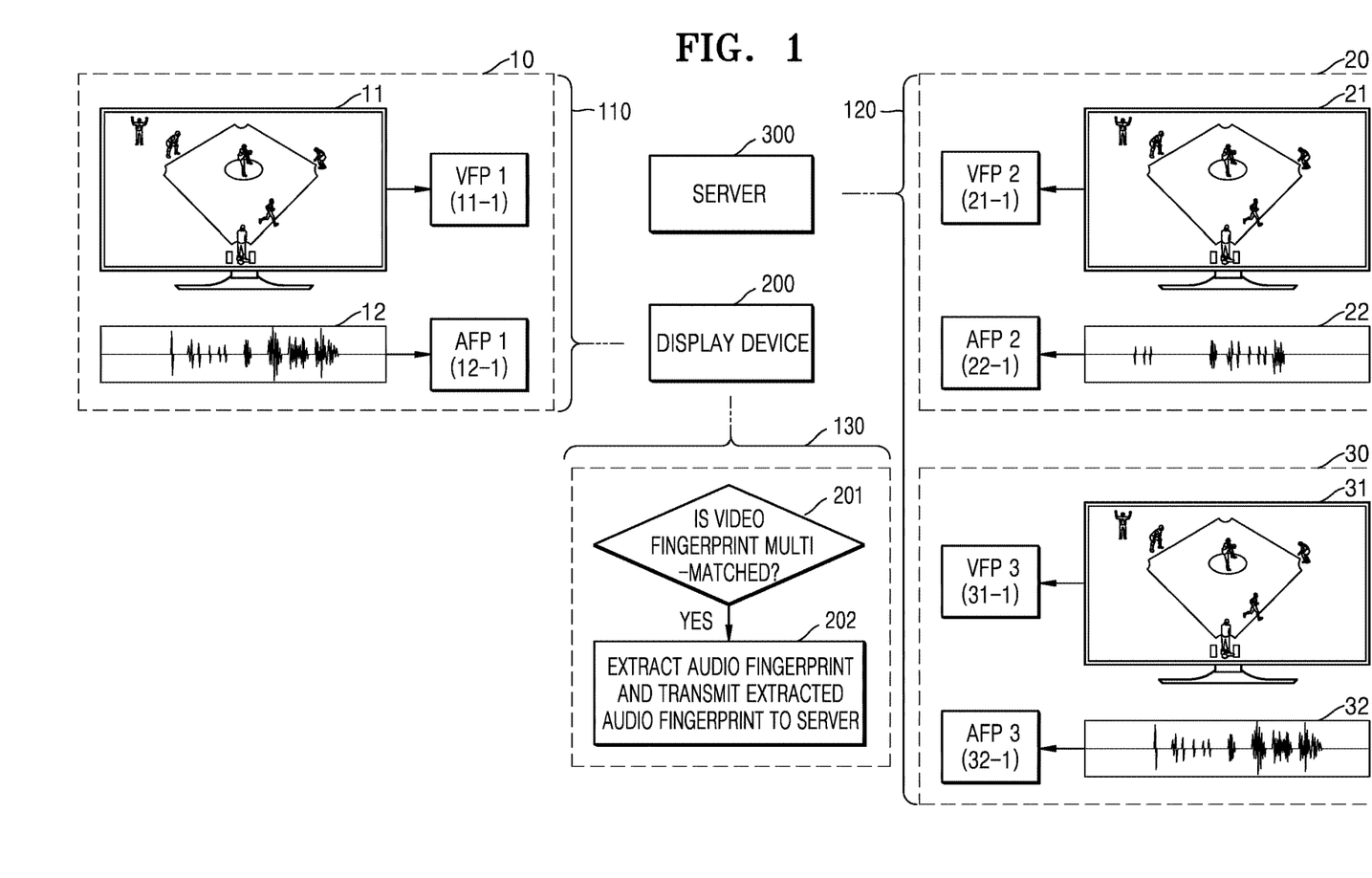
FIG. 1 is a diagram illustrating a method, performed by a display device, of obtaining information about content displayed on a display of the display device, according to some embodiments.

FIG. 1 is a diagram illustrating a method, performed by a display device, of obtaining information about content displayed on a display of the display device, according to some embodiments.

A display device 200 according to some embodiments may obtain, from a server 300, information about current content displayed on a display of the display device 200, by using at least one of a video fingerprint (VFP) or an audio fingerprint (AFP) of the content. The display device 200 may obtain the information about the current content that is currently being broadcast or reproduced, identify the current content, and provide a user with information related to the current content.

Information about content may include various pieces of information related to the content. For example, information about content may include at least one of content identification information, a content title, a content reproduction duration, a content type, a content provider, content details, or main characters of the content. However, the present disclosure is not limited thereto.

Referring to FIG. 1, an example of content being broadcast or reproduced by the display device 200 is illustrated in 110 of FIG. 1. For example, first baseball game content 10 including a first baseball game image 11 and a first baseball game audio 12 may be broadcast or reproduced on the display device 200. The first baseball game image 11 is currently displayed on the display of the display device 200.

The display device 200 may extract at least one of a video fingerprint or an audio fingerprint of the current content, to obtain the information about the current content. The term "fingerprint" refers to unique data that may distinguish one frame from other frames. The fingerprint will be described in detail with reference to FIG. 2.

Referring to FIG. 1, the display device 200 may extract at least one of a first video fingerprint VFP 1 11-1 regarding the first baseball game image 11 of the first baseball game content 10, or a first audio fingerprint AFP 1 12-1 regarding the first baseball game audio 12.

The display device 200 may transmit the at least one of the extracted video fingerprint or the extracted audio fingerprint to the server 300. Transmission of an extracted fingerprint from the display device 200 to the server 300 may be performed by transmitting a content identification request. The server 300 stores video fingerprints and audio fingerprints extracted from, and thus, regarding a plurality of content items, and also stores information about each content item. An example of a database of video fingerprints and audio fingerprints regarding a plurality of content items stored in the server 300 is illustrated in 120 of FIG. 1.

The server 300 may match at least one of the video fingerprint or the audio fingerprint received from the display device 200, to the video fingerprints or the audio fingerprints stored in the server 300. That the server 300 matches the fingerprint received from the display device 200, to the fingerprints stored in the server 300 may means that the server 300 searches the fingerprints stored in the server 300, for fingerprints identical or similar to the fingerprint received from the display device 200, to identify a fingerprint identical to the fingerprint received from the display device 200.

The server 300 may transmit a response including a matching result to the display device 200. The matching result may include at least one fingerprint that matches the fingerprint received from the display device 200. The matching result may also include the number of fingerprints stored in the server 300 that match the fingerprint received from the display device 200. The matching result may also include information about whether the fingerprint received from the display device 200 is multi-matched. The response may include information about a content item corresponding to each of the at least one fingerprint that matches the video fingerprint received from the display device 200.

The display device 200 may receive the response including the matching result from the server 300, and thus, obtain information about the current content being broadcast or reproduced.

The fingerprint received from the display device 200 may match a plurality of fingerprints among the fingerprints stored in the server 300. In this case, the fingerprint is multi-matched. On the other hand, the fingerprint received from the display device 200 may match one of the fingerprints stored in the server 300. In this case, the fingerprint is single-matched.

For example, in a case of the current content being sporting event content, image signals broadcast by different broadcasters may be the same or similar, but audio signals may be different due to different commentators. In this case, the video fingerprint of the current content may be multi-matched to the different content items, and thus, it may be difficult to identify by which broadcaster the current content is broadcast or reproduced, by using only video fingerprint matching.

In a case where the video fingerprint of the current content is multi-matched, an audio fingerprint of the current content may be further required to match the current content being displayed on the display device 200 to one of the content items stored in the server 300. That is, the server 300 may search for a content item corresponding to both of two fingerprints, which are, a video fingerprint that matches the video fingerprint received from the display device 200, and an audio fingerprint that matches the audio fingerprint received from the display device 200. In other words, the server 300 may search for a content item corresponding to a combination of the matched video fingerprint and the matched audio fingerprint, and may transmit information about the content item to the display device 200.

Referring to FIG. 1, the server 300 may receive, from the display device 200, at least one of the first video fingerprint VFP 1 11-1 regarding the first baseball game image 11, or the first audio fingerprint AFP 1 12-1 regarding the first baseball game audio 12. The server 300 may search a database 120 of the video fingerprints and the audio fingerprints regarding the plurality of content items stored in the server 300, for a fingerprint that matches the fingerprint received from the display device 200.

In a case where the first video fingerprint VFP 1 11-1, that the server 300 has received from the display device 200, is multi-matched with video fingerprints VFP 2 21-1 and VFP 3 31-1 among a plurality of video fingerprints stored in the server 300, the server 300 may match the received first audio fingerprint AFP 1 12-1 to an audio fingerprint AFP 3 32-1 among a plurality of audio fingerprints stored in the server 300. Accordingly, the server 300 may determine that third baseball game content 30, which corresponds to the video fingerprint VFP 3 31-1 and the audio fingerprint AFP 3 32-1 stored in the server 300, corresponds to a combination of the video fingerprint VFP 1 11-1 and the audio fingerprint AFP 1 12-1 received from the display device 200.

Meanwhile, a conventional display device extracts both a video fingerprint and an audio fingerprint of content regardless of whether the video fingerprint is multi-matched, and transmits the extracted video and audio fingerprints to a server. However, if the video fingerprint is single-matched, the content is also single-matched, and accordingly, the server does not need to perform a process of matching the audio fingerprint. Accordingly, in a case of the video fingerprint being single-matched, resources may be unnecessarily consumed for operations of extracting an audio fingerprint, transmitting the extracted audio fingerprint to the server, receiving the transmitted audio fingerprint, and the like.

In performing a method of matching a fingerprint of content to obtain information about the content, the display device 200 of the present disclosure may reduce the amount of resources used by the display device 200 and the server 300 by extracting the audio fingerprint only in case that the video fingerprint are multi-matched, and transmitting the extracted audio fingerprint to the server 300.

An operation of the display device 200 is schematically illustrated in 130 of FIG. 1.

In operation 201, the display device 200 may determine whether the video fingerprint, that the display device 200 extracted from a video signal of the current content being displayed on the display, is multi-matched by the server 300. The display device 200 may determine whether the extracted video fingerprint is multi-matched, by receiving, from the server 300, a plurality of video fingerprints stored in the server 300 that match the fingerprint received from the display device 200, receiving information indicating that matched video fingerprints stored in the server 300 is plural in number, or receiving information indicating that the extracted video fingerprint is multi-matched by the server 300.

In operation 202, in a case of the extracted video fingerprint being multi-matched, the display device 200 may extract an audio fingerprint from an audio signal of the current content being displayed on the display. The display device 200 may transmit the extracted audio fingerprint to the server 300, and receive, from the server 300, a response including a matching result with respect to the audio fingerprints stored in the server 300. The response may include information about the content corresponding to the combination of the video fingerprint and the audio fingerprint extracted by the display device 200.

In performing the method of matching a fingerprint of content to obtain information about the content, the display device 200 of the present disclosure may not extract an audio fingerprint, in a case where the video fingerprint is single-matched, thereby reducing the amount of resources unnecessarily consumed by the display device 200 and the server 300 for operations of extracting an audio fingerprint, transmitting the extracted audio fingerprint to the server 300, receiving the transmitted audio fingerprint, and the like.

Figure 2:
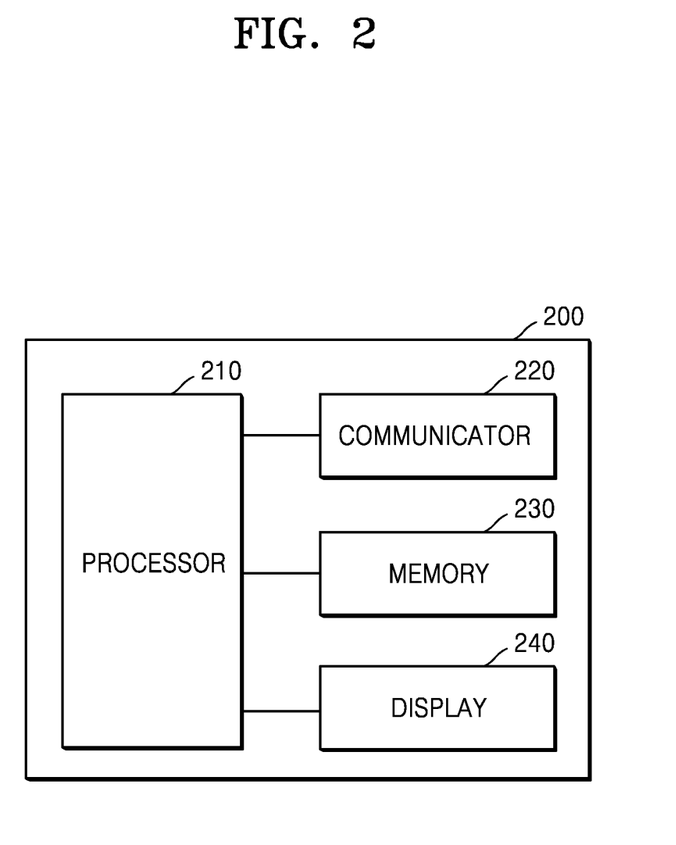
FIG. 2 is a block diagram illustrating a configuration of a display device, according to some embodiments.

FIG. 2 is a block diagram illustrating a configuration of the display device 200, according to some embodiments.

As illustrated in FIG. 2, the display device 200 may include a processor 210, a communicator 220, a memory 230, and a display 240.

The display device 200 may be implemented as various electronic devices such as a television, a desktop PC, a handheld PA, or a personal digital assistant.

The processor 210 may execute one or more programs stored in the memory 230, and may perform overall control of the components of the display device 200. The processor 210 may include a single core, dual cores, triple cores, quad cores, or cores corresponding to a multiple thereof. The processor 210 may include a plurality of processors. For example, the processor 210 may include a main processor (not shown) and a sub-processor operating in a power saving mode.

The communicator 220 may transmit and receive data or signals to and from an external device under the control by the processor 210.

The communicator 220 may transmit and receive data or signals to and from the external device by using various wired and wireless communication schemes such as a local area network (LAN), a wireless LAN (WLAN) (e.g., Wi-Fi), wired Ethernet, Bluetooth Low Energy (BLE), Long-Term Evolution (LTE), 5G, or the like, in accordance with the capability and structure of the display device 200.

The communicator 220 may receive various content items in a wired or wireless manner. For example, the communicator 220 may receive a broadcast service signal or a video on demand (VOD) service signal.

The processor 210 may transmit and receive a video fingerprint or an audio fingerprint to and from the server 300 through the communicator 220, and may receive a fingerprint matching result and information about content from the server 300.

The memory 230 may store various pieces of data, programs, or applications for operating and controlling the display device 200.

The program stored in the memory 230 may include one or more instructions. The program (one or more instructions) or an application stored in the memory 230 may be executed by the processor 210.

The display 240 may convert an image signal, a data signal, an on-screen display (OSD) signal, a control signal, or the like, that has been processed by the processor 210, so as to generate a driving signal. The display 240 may be implemented as a plasma display panel (PDP), a liquid-crystal display (LCD), an organic light-emitting diode (OLED), a flexible display, or a three-dimensional (3D) display. The display 240 may be configured as a touch screen to be used as both an output device and an input device.

The processor 210 may extract a video fingerprint and/or an audio fingerprint of content being displayed on the display 240.

The term "fingerprint" refers to unique data that may distinguish one frame from other frames. The fingerprint is feature data extracted from a video, image, or audio signal included in a frame, and reflects unique features of the frame. For example, an audio fingerprint from an audio signal is data representing features such as the frequency, amplitude, or the like of the audio signal, while a video fingerprint from an image or video signal is data representing features such as a motion vector, colors, or the like of the image or video signal.

A fingerprint may be extracted by using various algorithms known in the art. For example, an audio signal is divided by certain time intervals, and then the magnitudes of signals of frequencies included in the time intervals may be calculated. Thereafter, fingerprint data may be generated by calculating magnitude differences between the signals of adjacent frequency sections, to calculate frequency gradients, and quantizing the gradients to be 1 when the gradient is a positive number, or to be 0 when the gradient is a negative number.

Throughout the present disclosure, extraction of a video fingerprint and extraction of an audio fingerprint may mean generation of a video fingerprint and generation of an audio fingerprint, respectively.

According to some embodiments, the processor 210 may extract the video fingerprint from the current content being displayed on the display, transmit the extracted video fingerprint to the server 300, receive, from the server 300, a first response including a matching result of the extracted video fingerprint and the video fingerprints stored in the server 300, extract, in case that the extracted video fingerprint matches a plurality of video fingerprints stored in the server 300 according to the first response, an audio fingerprint from the current content being displayed on the display, transmit the extracted audio fingerprint to the server 300, and receive, from the server 300, a second response including a matching result of the extracted audio fingerprint and the audio fingerprints stored in the server 300.

By this configuration, the display device 200 according to the present disclosure may extract the audio fingerprint only in a case where the extracted video fingerprint is multi-matched, thereby reducing the amount of resources unnecessarily consumed by the display device 200 and the server 300 for operations of extracting an audio fingerprint, transmitting the extracted audio fingerprint to the server 300, receiving the transmitted audio fingerprint, and the like.

According to some embodiments, the second response may include the matching result of the extracted audio fingerprint and each of audio fingerprints corresponding to a plurality of content items corresponding to the plurality of video fingerprints that match the extracted video fingerprint, among the audio fingerprints stored in the server 300.

According to some embodiments, the first response may include information about a content item corresponding to at least one video fingerprint that matches the extracted video fingerprint, and the second response may include information about a content item corresponding to a combination of the plurality of video fingerprints that match the extracted video fingerprint, and the audio fingerprint that matches the extract audio fingerprint.

According to some embodiments, the processor 210 may extract the video fingerprint and the audio fingerprint from the current content being displayed on the display at preset time intervals, extract, in case that the extracted video fingerprint matches a plurality of video fingerprints stored in the server 300 according to the first response, an audio fingerprint from the current content being displayed on the display, at preset time intervals, and stop, in case that the extract video fingerprint matches one video fingerprint stored in the server 300 according to the first response, the extraction of an audio fingerprint.

By this configuration, the display device 200 according to the present disclosure may periodically extract an audio fingerprint from the current content in a case where the video fingerprint is multi-matched, and stop the extraction of an audio fingerprint in a case where the video fingerprint is single-matched, thereby reducing the amount of resources unnecessarily consumed by the display device 200 and the server 300 for operations of extracting an audio fingerprint, transmitting the extracted audio fingerprint to the server 300, receiving the transmitted audio fingerprint, and the like.

According to some embodiments, the first response may include information about a time period, among time periods constituting the extracted video fingerprint, in which the extracted video fingerprint matches the plurality of video fingerprints stored in the server 300, and, based on the first response, the processor 210 may extract the audio fingerprint from the current content being displayed on the display, with respect to the time period in which the extracted video fingerprint matches the plurality of video fingerprints.

By this configuration, the display device 200 according to the present disclosure may extract the audio fingerprint only regarding the time period of the video fingerprint in which the video fingerprint is multi-matched, thereby reducing the amount of resources used for content matching.

Figure 3:
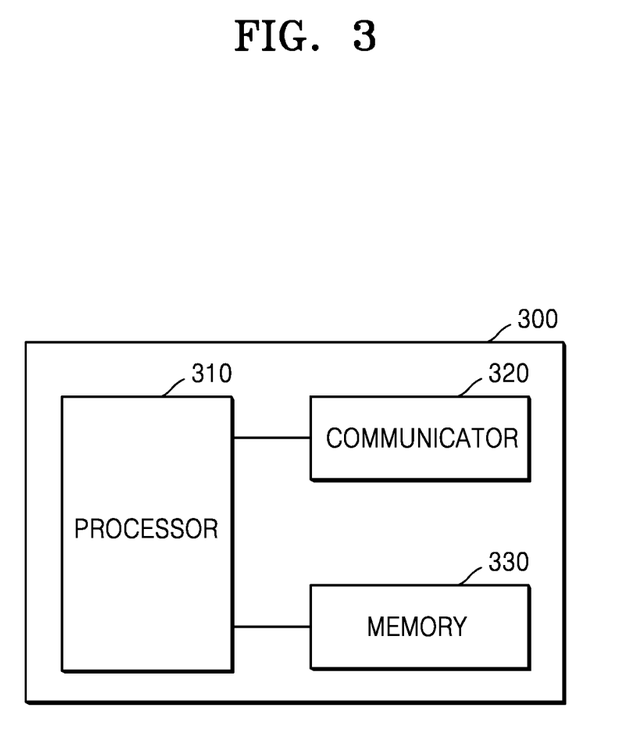
FIG. 3 is a block diagram illustrating a configuration of a server, according to some embodiments.

FIG. 3 is a block diagram illustrating a configuration of the server 200, according to some embodiment.

As illustrated in FIG. 3, the server 300 may include a processor 310, a communicator 320, and a memory 330.

The processor 310 may include one or more processors, and may perform overall control of the components of the server 300.

The communicator 320 may transmit and receive data or signals to and from an external device under the control by the processor 310.

The communicator 320 may transmit and receive data or signals to and from the display device 200 by using a wireless LAN (WLAN) (e.g., Wi-Fi), wired Ethernet, or other various wired and wireless communication schemes, in accordance with the capability and structure of the server 300.

The communicator 320 may receive various content items in a wired or wireless manner. For example, the communicator 320 may receive a broadcast service signal or a video on demand (VOD) service signal. The communicator 320 may also receive a content item and information thereof. The information about content may include, but is not limited to, various pieces of content-related information such as content identification information, a content title, a content reproduction duration, a content type, a content provider, content details, and main characters of the content.

The communicator 320 may transmit and receive data or signals to and from the display device 200 under the control by the processor 310. The processor 310 may transmit and receive a video fingerprint or an audio fingerprint to and from the display device 200 through the communicator 320, according to a content recognition request received from the display device 200, and may transmit, to the display device 200, a fingerprint matching result and information about content.

The memory 330 may store various pieces of data, programs, or applications for operating and controlling the server 300. The program stored in the memory 330 may include one or more instructions. The program (one or more instructions) or an application stored in the memory 330 may be executed by the processor 310. In addition, the memory 330 may store received content and/or information about the content.

The processor 310 may extract a video fingerprint and an audio fingerprint from the received content. The processor 310 may store the extracted video fingerprint and audio fingerprint in a database of the memory 330.

The processor 310 may match a video fingerprint and an audio fingerprint received from the display device 200, to the video fingerprints and the audio fingerprints stored in the database, according to the content recognition request received from the display device 200. The processor 310 may also search for a content item corresponding to a video fingerprint, an audio fingerprint, or a combination thereof, that matches the fingerprint received from the display device 200.

Figure 4:
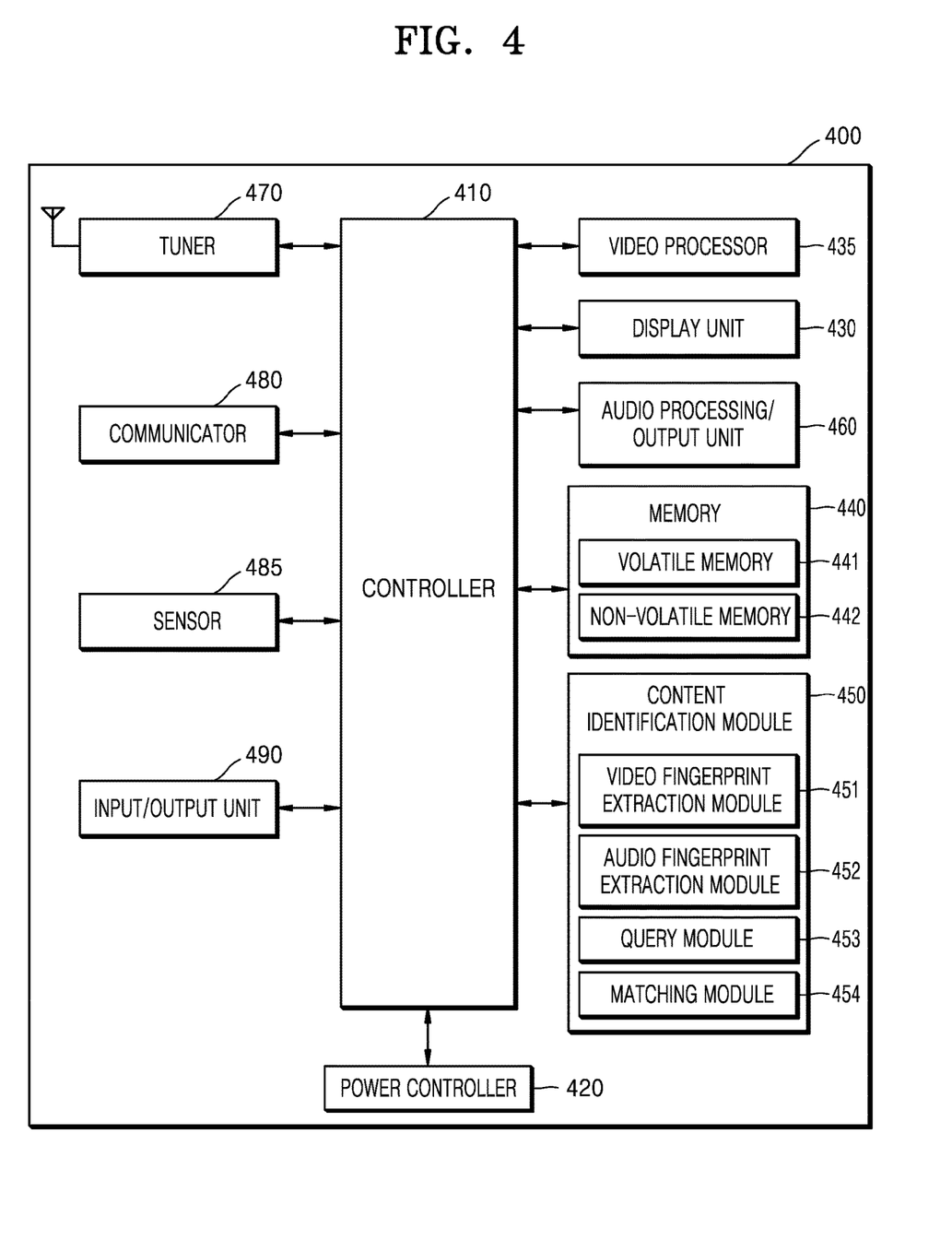
FIG. 4 is a block diagram illustrating a detailed configuration of a display device, according to some embodiments.

FIG. 4 is a block diagram illustrating a detailed configuration of a display device, according to some embodiments.

As illustrated in FIG. 4, the display device 400 may include a controller 410, a power controller 420, a display unit 430, a video processor 435, a memory 440 including a volatile memory 441 and a non-volatile memory 442, a content identification module 450, an audio processing/output unit 460, a tuner 470, a communicator 480, a sensor 485, and an input/output unit 490.

The same descriptions as those provided with reference to FIG. 2 will be omitted.

The display device 400 according to an embodiment may be a TV, but this is merely an embodiment, and may be implemented as an electronic device including a display. For example, the display device 400 may be implemented as various electronic devices such as cellular phones, tablet PCs, digital cameras, camcorders, laptop computers, tablet PCs, desktop computers, electronic book terminals, digital broadcasting terminals, personal digital assistants (PDAs), portable multimedia players (PMPs), navigation systems, MP3 players, wearable devices, or the like.

The power controller 420 may provide power to each functional block of the display device 400.

The display unit 430 may display a video included in a broadcast signal received through the tuner 470, on a screen under the control by the controller 410. The display unit 430 may also display content (e.g., a moving image) input through the communicator 480 or the input/output unit 490. The display unit 430 may also output an image stored in the memory 440 under the control by the controller 410.

The display unit 430 may also convert a video signal, a data signal, an OSD signal, a control signal, or the like, that has been processed by the controller 410, so as to generate a driving signal. The display unit 430 may be implemented as a PDP, an LCD, an OLED, a flexible display, or a three-dimensional (3D) display. Also, the display unit 430 may be configured as a touch screen to be used as both an output device and an input device.

The video processor 435 may process video data received by the display device 400. The video processor 435 may perform various image processing operations such as decoding, scaling, noise filtering, frame rate conversion, resolution conversion, or the like, on the video data.

The audio processing/output unit 460 may process audio data. The audio processing/output unit 460 may perform various processing operations such as decoding, amplifying, noise filtering, or the like, on the audio data. The audio processing/output unit 460 may include at least one of a speaker, a headphone output port, or a Sony/Philips digital interface (S/PDIF) output port, for outputting a processed audio.

The tuner 470 may be tuned to and select only a frequency of a channel desired to be received by the display device 400 from among many radio wave components by performing, for example, amplification, mixing, and resonance on a broadcast signal received in a wired or wireless manner. The broadcast signal includes audio, video, and additional information (e.g., an electronic program guide (EPG)).

The communicator 480 may connect the display device 400 to an external device (e.g., an audio device) under the control by the controller 410. The controller 410 may transmit or receive content to or from a connected external device, download an application from the external device, or perform web browsing through the communicator 480. The communicator 480 may include a wireless LAN interface, a Bluetooth interface, a BLE interface, an NFC interface, a wired Ethernet interface, or the like, in accordance with the capability and structure of the display device 400. The communicator 480 may also receive a control signal of a remote control device under the control by the controller 410. The control signal may be implemented as a Bluetooth type, an RF signal type, or a Wi-Fi type. The communicator 480 may receive a control signal of the remote control device implemented as a Bluetooth type, an RF signal type, or a Wi-Fi type.

The sensor 485 may detect a user's voice, a user's image, or a user's interaction, and may include a microphone, a camera, and an optical receiver. The optical receiver may receive an optical signal (including a control signal) from an external remote control device. For example, the optical receiver may receive a power-on input or a power-off input for the display device 400 from the external remote control device.

The input/output unit 490 may receive a video signal (e.g., a moving image), an audio signal (e.g., voice or music), and additional information (e.g., an EPG) from outside the display device 400 under the control by the controller 410. The input/output unit 490 may include a high-definition multimedia interface (HDMI) port, a component jack, a PC port, a USB port, or a combination thereof.

The memory 440 may store various pieces of data, programs, or applications for operating and controlling the display device 400 under the control by the controller 410. The memory 440 may store signals or data that is input or output corresponding to the operation of each component of the display device 400.

The memory 440 may store an operating system for controlling the display device 400 and the controller 410, applications initially provided by a manufacturer or downloaded from the outside, a graphical user interface (GUI) related to the applications, objects (e.g., image texts, icons, buttons) for providing the GUIs, user information, documents, databases, or related data.

The memory 440 may include the volatile memory 441 and the non-volatile memory 442. The volatile memory 441 is a memory that retains stored information while power supply is being maintained, while the non-volatile memory 442 is a memory that retains stored information even when the power supply is interrupted. The volatile memory 441 may include a dynamic random-access memory (DRAM), a static random access memory (SRAM), or the like, and the non-volatile memory 442 may include a read-only memory (ROM), a flash memory, a memory card (e.g., a micro-SD card, a USB memory), a hard disk drive (HDD), or a solid state drive (SSD). The volatile memory 441 may store an operating system loaded when the system boots, one or more application programs being executed, and input/output data related to the execution of an application.

In particular, when the display device 400 enters a power saving mode by using a suspend-to-ram function, minimum power may be supplied to the volatile memory 441 such that information stored in the volatile memory 441 may be retained, whereas, when the display device 400 is cold-powered off, the information stored in the volatile memory 441 may be lost.

The content identification module 450 may include appropriate logics, circuits, interfaces, and/or code operable to identify content being displayed on the display device 400 and obtain information about the content.

The video fingerprint extraction module 451 may include appropriate logics, circuits, interfaces, and/or code operable to extract a video fingerprint from content being displayed on the display device 400. For example, the video fingerprint extraction module 451 may capture frames at preset intervals while the content is being output, and extract a video fingerprint from the frames. The video fingerprint extraction module 451 may also store the extracted video fingerprint in a video fingerprint stack.

The audio fingerprint extraction module 452 may include appropriate logics, circuits, interfaces, and/or code operable to extract an audio fingerprint from content displayed on the display device 400. For example, the audio fingerprint extraction module 452 may capture frames at preset intervals while the content is being output, and extract an audio fingerprint from the frames. The audio fingerprint extraction module 452 may also store the extracted audio fingerprint in an audio fingerprint stack.

For example, the audio fingerprint extraction module 452 may receive pulse-code modulation (PCM) data for an audio signal, and process the PCM data to extract an audio fingerprint, under the control by the controller 410.

According to some embodiments, the audio fingerprint extraction module 452 may stop the extraction of an audio fingerprint in response to receipt of an audio fingerprint extraction stop signal from a query module 453, and may extract an audio fingerprint in response to receipt of an audio fingerprint extraction signal.

The query module 453 may include appropriate logics, circuits, interfaces, and/or code operable to determine whether the video fingerprint extracted from the current content being displayed on the display device 400 is multi-matched, control the operation of the audio fingerprint extraction module 452, and transmit, to a matching module 454, a signal for causing the matching module 454 to transmit a content identification request to the server 300.

According to some embodiments, in a case where the video fingerprint extracted from the current content being displayed on the display device 400 is multi-matched, the query module 453 may transmit, to the audio fingerprint extraction module 452, a signal for causing the audio fingerprint extraction module 452 to stop the extraction of an audio fingerprint. For example, the query module 453 may stop the extraction of an audio fingerprint by transmitting, to the audio fingerprint extraction module 452, a signal for causing the audio fingerprint extraction module 452 to stop receiving PCM data for an audio signal, under the control by the controller 410.

The matching module 454 may include appropriate logics, circuits, interfaces, and/or code operable to receive a response including a matching result from the server 300, transmit a content recognition request to the server 300, and initialize the video and audio fingerprint stacks.

For example, the matching module 454 may transmit, to the query module 453, the response including the matching result received from the server 300. The matching module 454 may also transmit an audio or video fingerprint stored in the audio or video fingerprint stack to the server 300 in response to receipt of a signal from the query module 453. The matching module 454 may initialize the audio or video fingerprint stack after transmitting the audio or video fingerprint to the server 300.

Meanwhile, the block diagrams of the display devices 200 and 400 illustrated in FIGS. 2 and 4 are merely example embodiments. Each of the components illustrated in the block diagrams may be integrated, added, or omitted according to specifications of the display devices 200 and 400 actually implemented. That is, two or more components may be combined into one component, or one component may be divided into two or more components, according to necessity. Also, a function performed by each block is for describing embodiments, and its specific operation or device does not limit the scope of the present disclosure.

Hereinafter, a detailed example of an operating method of the display device will be described with reference to FIGS. 5 to 7.

Figure 5:
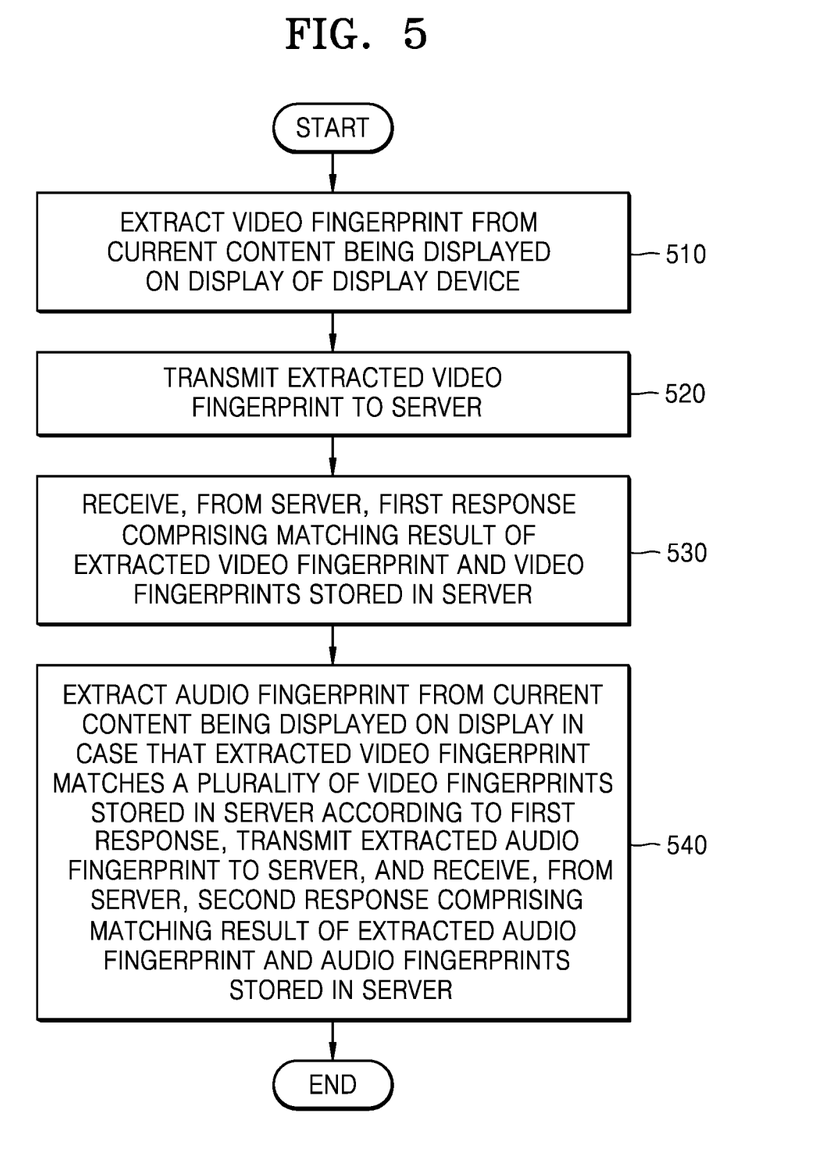
FIG. 5 is a flowchart illustrating a method, performed by a display device, of extracting an audio fingerprint based on whether a video fingerprint extracted from current content is multi-matched, according to some embodiments.

FIG. 5 is a flowchart illustrating a method, performed by a display device, of extracting an audio fingerprint based on whether a video fingerprint extracted from current content is multi-matched, according to some embodiments.

The same descriptions as those provided with reference to FIG. 1 will be omitted.

In operation 510, the display device 200 may extract a video fingerprint from the current content being displayed on the display of the display device 200.

In operation 520, the display device 200 may transmit the extracted video fingerprint to the server 300. As described above with reference to FIG. 1, transmission of an extracted fingerprint from the display device 200 to the server 300 may be performed by transmitting a content identification request.

In operation 530, the display device 200 may receive, from the server 300, the first response including the matching result of the extracted video fingerprint and the video fingerprints stored in the server 300.

The server 300 may store, in a database, a plurality of content items, information about the plurality of content items, video fingerprints and audio fingerprints regarding each of the plurality of content items.

The server 300 may match the extracted video fingerprint received from the display device 200 to at least one video fingerprint stored in the server 300. In other words, the server 300 may search the video fingerprints stored in the server 300, for video fingerprints identical or similar to the extracted video fingerprint received from the display device 200, to match the video fingerprints to the extracted video fingerprint received from the display device 200.

The server 300 may transmit the first response including the matching result to the display device 200. The matching result included in the first response may include at least one video fingerprint that matches the extracted video fingerprint received from the display device 200. The matching result may also include the number of video fingerprints that match the extracted video fingerprint received from the display device 200. The matching result may also include information about whether the extracted video fingerprint received from the display device 200 is multi-matched. The first response may include information about a content item corresponding to each of at least one fingerprint that matches the extracted video fingerprint received from the display device 200.

In operation 540, in case that the extracted video fingerprint matches a plurality of video fingerprints stored in the server 300 according to the first response, the display device 200 may extract an audio fingerprint from the current content being displayed on the display, transmit the extracted audio fingerprint to the server 300, and receive, from the server 300, a second response including a matching result of the extracted audio fingerprint and the audio fingerprints stored in the server 300.

That is, in a case where the extracted video fingerprint is multi-matched, the display device 200 may extract an audio fingerprint from the current content. In performing the method of matching a fingerprint of content to obtain information about the content, the display device 200 of the present disclosure may not extract an audio fingerprint, in a case where the video fingerprint is single-matched, thereby reducing the amount of resources unnecessarily consumed by the display device 200 and the server 300 for operations of extracting an audio fingerprint, transmitting the extracted audio fingerprint to the server 300, receiving the transmitted audio fingerprint, and the like.

The display device 200 according to some embodiments may determine whether the extracted video fingerprint is multi-matched, based the first response received from the server 300. For example, in a case where the first response comprises a plurality of video fingerprints that match the extracted video fingerprint received from the display device 200, information indicating that matched video fingerprints stored in the server 300, is plural in number, or information indicating that the extracted video fingerprint is multi-matched, the display device 200 may determine that the extracted video fingerprint is multi-matched by the server 300.

According to some embodiments of the present disclosure, the first response may include information about a time period, among time periods constituting the video fingerprint extracted by the display device 200, in which the extracted video fingerprint matches a plurality of video fingerprints stored in the server 300 Here, a time period of a fingerprint corresponds to a time period of multimedia content corresponding to the fingerprint. Based on the first response, the display device 200 may extract an audio fingerprint from the current content being displayed on the display with respect to the time period in which the extracted video fingerprint matches the plurality of video fingerprints (i.e., is multi-matched).

The method, performed by the server 300, of matching the audio fingerprint received from the display device 200, to the audio fingerprints stored in the server 300, according to some embodiments, corresponds to the method of matching the video fingerprint received from the display device 200, to the video fingerprints stored in the server 300.

In addition, the server 300 may search for a content item corresponding to both of two fingerprints, which are, a video fingerprint that matches the video fingerprint received from the display device 200, and an audio fingerprint that matches the audio fingerprint received from the display device 200, from among the fingerprints stored in the server. For example, the server 300 may search audio fingerprints stored in the server 300, which correspond to the content items that correspond to the plurality of video fingerprints stored in the server 300 that match the extracted video fingerprint received from the display device 200, for an audio fingerprint that matches the extracted audio fingerprint received from the display device 200. The server 300 may search for a content item corresponding to a combination of a video fingerprint and an audio fingerprint that match the extracted video fingerprint and the extracted audio fingerprint, respectively, and may add information about the content item to the second response and transmit the second response to the display device 200.

The server 300 may transmit the second response including the matching result to the display device 200. For example, the second response may include the matching result of the audio fingerprint received from the display device 200, and each of audio fingerprints, among the audio fingerprints stored in the server 300, corresponding to the plurality of content items corresponding to the plurality of video fingerprints that match the video fingerprint received from the display device 200.

The matching result included in the second response may include at least one audio fingerprint that matches the audio fingerprint received from the display device 200. The matching result included in the second response may also include the combination of the video fingerprint and the audio fingerprint stored in the server 300, that matches the combination of the video fingerprint and the audio fingerprint received from the display device 200. The second response may include information about the content item corresponding to the combination of the video fingerprint and the audio fingerprint stored in the server, that matches the combination of the video fingerprint and the audio fingerprint received from the display device 200.

Meanwhile, the current content being broadcast or reproduced by the display device 200 may match or correspond to two or more content items stored in the server 300. In other words, there may be two or more combinations of the video fingerprints and the audio fingerprints stored in the server, that match the combination of the video fingerprint and the audio fingerprint received from the display device 200.

Accordingly, the matching result included in the second response may include the number of audio fingerprints stored in the server 300 that match the audio fingerprint received from the display device 200 Also, the matching result may include information about whether the combination of the video fingerprint and the audio fingerprint received from the display device 200 is multi-matched. In this case, the second response may include information about a content item corresponding to each of the combinations of the video fingerprints and the audio fingerprints that match the combination of the video fingerprint and the audio fingerprint received from the display device 200. That is, in a case where the combination of the video fingerprint and the audio fingerprint extracted from the current content is multi-matched, the server 300 may transmit information, included in the second response, about all of content items corresponding to combinations of the video fingerprints and the audio fingerprints stored in the server 300, that match the combination of the video fingerprint and the audio fingerprint extracted from the current content.

Figure 6:
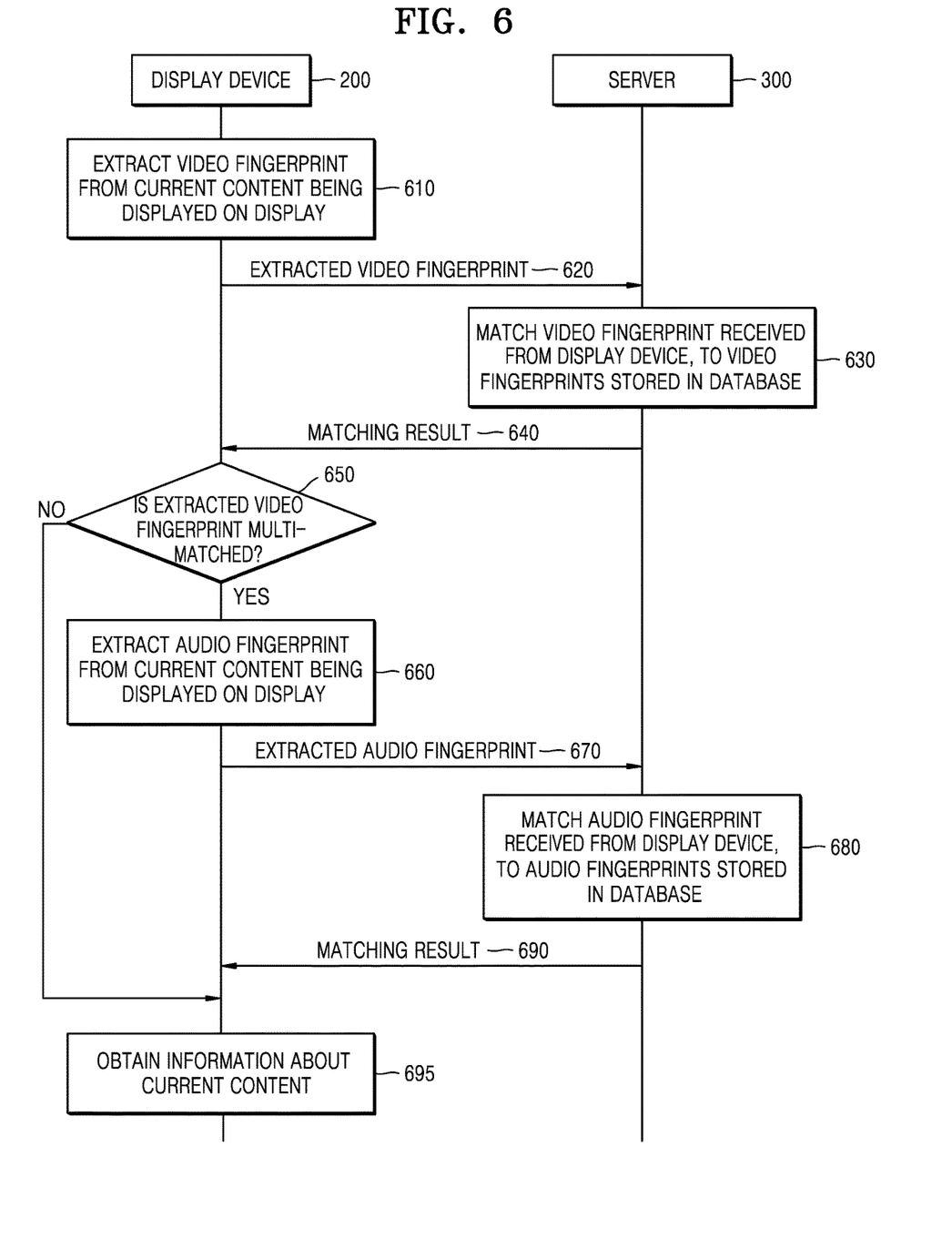
FIG. 6 is a flowchart illustrating a method, performed by a display device, of receiving, from a server, a matching result with respect to a video fingerprint or an audio fingerprint extracted from content, according to some embodiments.

FIG. 6 is a flowchart illustrating a method, performed by a display device, of receiving, from a server, a matching result with respect to a video fingerprint or an audio fingerprint extracted from content, according to some embodiments.

The same descriptions as those provided with reference to FIGS. 1 and 5 will be omitted.

In operation 610, the display device 200 may extract a video fingerprint from the current content being displayed on the display. In operation 620, the display device 200 may transmit the extracted video fingerprint to the server 300.

In operation 630, the server 300 may match the video fingerprint received from the display device 200, to the video fingerprints stored in the database.

In operation 640, the server 300 may transmit the matching result of the video fingerprint to the display device 200. The server 300 may transmit the first response including the matching result of the video fingerprint to the display device 200. Detailed descriptions of operations 630 and 640 correspond to those of operation 530 of FIG. 5 provided above.

In operation 650, the display device 200 may determine whether the extracted video fingerprint is multi-matched.

In a case where the extracted video fingerprint is multi-matched, in operation 660, the display device 200 may extract an audio fingerprint from the current content being displayed on the display.

In operation 670, the display device 200 may transmit the extracted audio fingerprint to the server 300.

In operation 680, the server 300 may match the audio fingerprint received from the display device 200, to the audio fingerprints stored in the database.

In operation 690, the server 300 may transmit the matching result the audio fingerprint to the display device 200. The server 300 may transmit the second response including the matching result of the audio fingerprint to the display device 200. Detailed descriptions of operations 650 to 690 correspond to those of operation 540 of FIG. 5 provided above.

In operation 695, the display device 200 may obtain information about the current content. In a case where the video fingerprint extracted from the current content is single-matched, the display device 200 may obtain the information about the current content based on the first response received from the server 300 in operation 640. In a case where the video fingerprint extracted from the current content is multi-matched, the display device 200 may obtain the information about the current content based on the second response received from the server 300 in operation 690.

Figure 7:
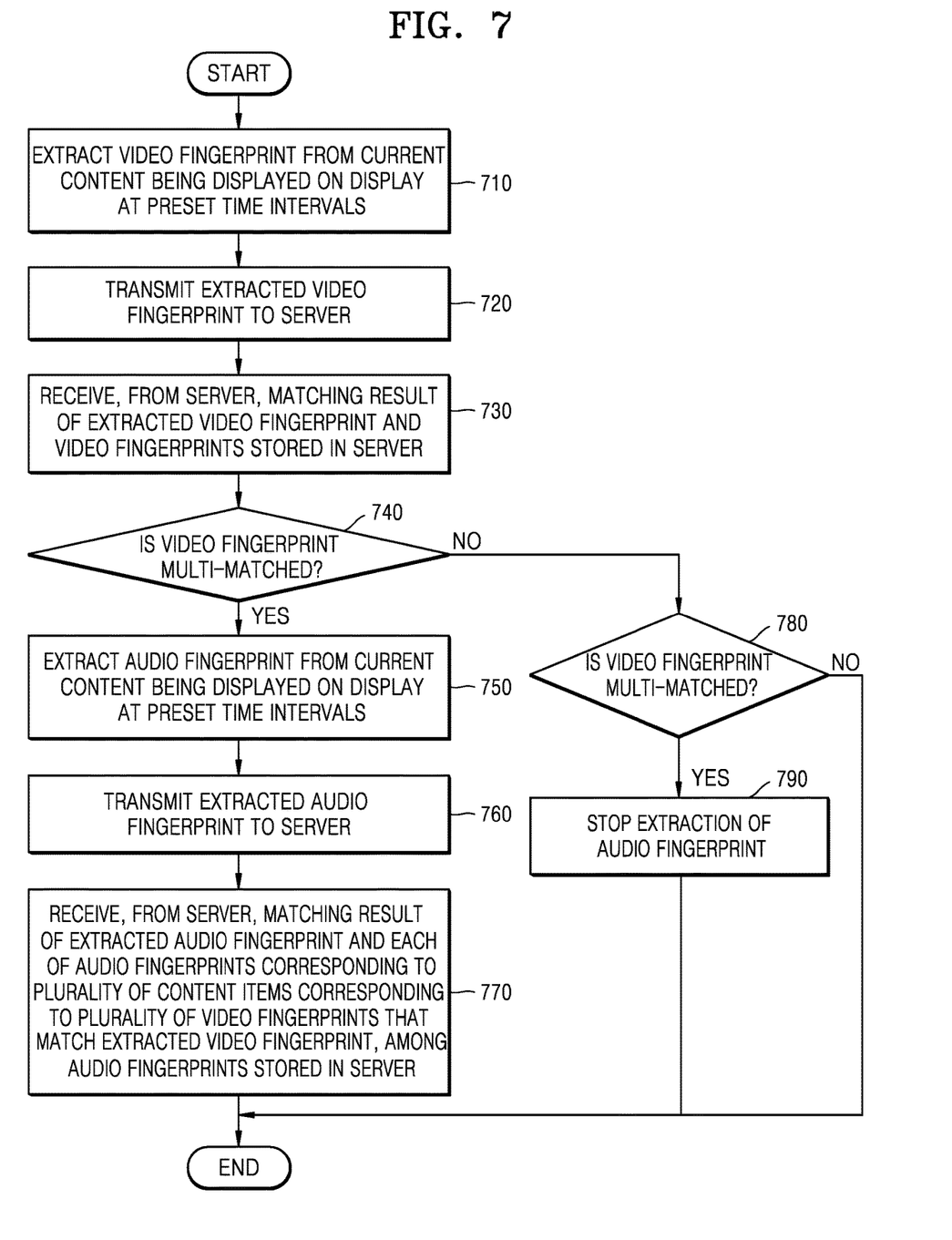
FIG. 7 is a flowchart illustrating a method, performed by a display device, of stopping extraction of an audio fingerprint based on whether a video fingerprint extracted from content is multi-matched, according to an embodiment.

FIG. 7 is a flowchart illustrating a method, performed by a display device, of stopping extraction of an audio fingerprint based on whether a video fingerprint extracted from content is multi-matched, according to an embodiment.

The same descriptions as those provided with reference to FIGS. 2, 5, and 6 are not provided with reference to FIG. 7.

In operation 710, the display device 200 may extract a video fingerprint from the current content being displayed on the display at preset time intervals.

The current content being broadcast or reproduced on the display device 200 may be changed according to time. For example, the current content being broadcasted or reproduced by the display device 200 may be changed in response to receipt of a user input for changing the channel, or in response to switching of the current content. The display device 200 may extract a video fingerprint from the current content at preset time intervals, in order to identify the current content being broadcast or reproduced and obtain the information about the current content. The preset time interval may be, for example, 500 ms, but is not limited thereto, and may be variously determined. Also, for example, the display device 200 may extract a video fingerprint from the current content in response to a channel change by the user.

In operation 720, the display device 200 may transmit the extracted video fingerprint to the server 300. As described above with reference to FIG. 1, Transmission of an extracted fingerprint from the display device 200 to the server 300 may be performed by transmitting a content identification request.

In operation 730, the display device 200 may receive, from the server 300, a matching result of the extracted video fingerprint and the video fingerprints stored in the server 300. The display device 200 may receive the first response including the above-described matching result from the server 300. Detailed descriptions of operation 730 may correspond to that of operation 530 of FIG. 5 provided above.

In operation 740, the display device 200 may determine whether the extracted video fingerprint is multi-matched. Detailed descriptions of operation 740 may correspond to that of operation 540 of FIG. 5 provided above.

In a case where the extracted video fingerprint is multi-matched, in operation 750, the display device 200 may extract an audio fingerprint from the current content being displayed on the display at preset time intervals.

A conventional display device periodically extracts a video fingerprint and an audio fingerprint from the current content being displayed on the display, respectively. Accordingly, even in a case where the extracted video fingerprint is single-matched, and thus, the current content may be also single-matched, the conventional display device unnecessarily consumes for periodically extracting an audio fingerprint from the current content.

The display device 200 of the present disclosure may reduce the amount of resources used for matching the current content, by periodically extracting an audio fingerprint only in a case where the extracted video fingerprint is multi-matched.

The preset time interval at which the display device 200 extracts an audio fingerprint from the current content may be, for example, 500 ms, but is not limited thereto, and may be variously determined.

In operation 760, the display device 200 may transmit the extracted audio fingerprint to the server 300.

In operation 770, the display device 200 may receive, from the server 300, the matching result of the extracted audio fingerprint and each of audio fingerprints corresponding to a plurality of content items corresponding to the plurality of video fingerprints that match the extracted video fingerprint, among the audio fingerprints stored in the server 300.

The display device 200 may receive the second response including the above-described matching result. Detailed descriptions of operation 770 may correspond to that of operation 540 of FIG. 5 provided above.

In a case where the combination of the video fingerprint and the audio fingerprint extracted from the current content by the display device 200 is single-matched to a combination of a video fingerprint and an audio fingerprint stored in the server 300 according to the above-described matching result, the current content being displayed on the display device 200 is single-matched to a content item stored in the server 300. In a case of the current content being single-matched, the display device 200 may stop the extraction of an audio fingerprint.

On the other hand, in a case where the combination of the video fingerprint and the audio fingerprint extracted from the current content by the display device 200 is multi-matched to a plurality of combinations of video fingerprints and audio fingerprints stored in the server 300 according to the above-described matching result, the current content being displayed on the display device 200 is multi-matched to a plurality of content items stored in the server 300. In a case of the current content being multi-matched, the display device 200 may continue to extract an audio fingerprint at the preset time intervals without stopping the extraction.

In operation 780, in a case where the extracted video fingerprint has not been multi-matched, that is, in a case where the extracted video fingerprint is single-matched, the display device 200 may determine whether the display device 200 is currently performing the extraction of an audio fingerprint.

Operations 710 to 790 of the display device 200 illustrated in FIG. 7 may be repeated. In a case where the extracted video fingerprint is multi-matched in the operations prior to beginning of operation 710, as described in operations 750 and 770, the display device 200 may be currently performing the extraction of an audio fingerprint from the current content at the preset time intervals. The display device 200 may determine whether the display device 200 is currently performing the extraction of an audio fingerprint from the current content at the preset time intervals.

In operation 790, in a case where the display device 200 is currently performing the extraction of an audio fingerprint, the display device 200 may stop the extraction of an audio fingerprint. For example, the display device 400 may stop the extraction of an audio fingerprint by stopping the transmission of PCM data for an audio signal to the audio fingerprint extraction module 452.

In a case where the extract video fingerprint is single-matched, the display device 200 of the present disclosure may reduce the amount of resources unnecessarily consumed by the display device 200 and the server 300 for operations of extracting an audio fingerprint, transmitting the extracted audio fingerprint to the server 300, receiving the transmitted audio fingerprint, and the like, by stopping the extraction of an audio fingerprint.

The operating method of the display device according to some embodiments may be embodied as program commands executable by various computer means and may be recorded on a computer-readable medium. The computer-readable medium may include program commands, data files, data structures, and the like separately or in combinations. The program commands to be recorded on the computer-readable medium may be specially designed and configured for embodiments of the present disclosure or may be well-known to and be usable by one of ordinary skill in the art of computer software. The computer readable medium may be included in a computer program product.

Examples of the computer-readable recording medium include magnetic media (e.g., hard disks, floppy disks, and magnetic tapes), optical media (e.g., CD-ROMs or DVDs), magneto-optical media (e.g., floptical disks), and hardware devices (e.g., ROMs, RAMs, or flash memories, etc.) that are specially configured to store and execute program commands. Examples of the program commands include both machine code, such as code made by a compiler, and high-level language code that may be executable by an interpreter.

While various example embodiments of the present disclosure have been described in detail, various changes in form and details may be made therein without departing from the scope of the present disclosure including the following claims.

The invention claimed is:

1. A display device comprising:
a display;
an audio processing/output unit;
a user interface:
a communicator;
a memory storing one or more instructions; and
a processor configured to execute the one or more instructions stored in the memory to:
receive, through the user interface, a user input of selecting a channel,
control the display to display images of video data of the selected channel,
control the audio processing/output unit to process audio data of the selected channel and output the processed audio data,
in response to the user input of selecting the channel, extract a video fingerprint from the video data being displayed on the display of the display device,
control the communicator to transmit the extracted video fingerprint to a server,
receive, via the communicator from the server, a first response comprising a matching result of the extracted video fingerprint and video fingerprints stored in the server,
based on the first response representing that the extracted video fingerprint matches a plurality of video fingerprints stored in the server and comprising information about a time period, among time periods constituting the extracted video fingerprint, in which the extracted video fingerprint matches the plurality of video fingerprints stored in the server, extract an audio fingerprint with respect to the time period in which the extracted video fingerprint matches the plurality of video fingerprints based on the first response, from the audio data being output by the audio processing/output unit of the display device, transmit the extracted audio fingerprint to the server, receive, via the communicator from the server, a second response comprising a matching result of the extracted audio fingerprint and audio fingerprints corresponding to the plurality of video fingerprints stored in the server and provide information about content of the selected channel being displayed on the display based on the second response, and based on the first response representing that the extracted video fingerprint matches one video fingerprint stored in the server and comprising information about the content of the selected channel being displayed on the display, provide the information about the content of the selected channel being displayed on the display based on the first response without extracting the audio fingerprint from the audio data being output by the audio processing/output unit of the display device.

2. The display device of claim 1, wherein the matching result included in the second response is a matching result of the extracted audio fingerprint and each of audio fingerprints corresponding to a plurality of content items corresponding to the plurality of video fingerprints that match the extracted video fingerprint, among audio fingerprints stored in the server.

3. The display device of claim 1, wherein the first response further comprises information about a content item corresponding to at least one video fingerprint that matches the extracted video fingerprint, and the second response further comprises information about a content item corresponding to a combination of the plurality of video fingerprints that match the extracted video fingerprint, and an audio fingerprint that matches the extracted audio fingerprint.

4. The display device of claim 1, wherein the processor is further configured to execute the one or more instructions to:

extract the video fingerprint and the audio fingerprint from the content being displayed on the display at preset time intervals, extract the audio fingerprint from the content being displayed on the display, at preset time intervals, in case that the extracted video fingerprint matches the plurality of video fingerprints stored in the server according to the first response, and stop the extraction of the audio fingerprint, in case that the extracted video fingerprint matches one video fingerprint stored in the server.

5. An operating method of a display device, the operating method comprising:

receiving a user input of selecting a channel;
displaying images of video data of the selected channel;
processing audio data of the selected channel and outputting the processed audio data;
in response to the user input of the selecting the channel, extracting a video fingerprint from the video data being displayed on a display of the display device;
transmitting the extracted video fingerprint to a server;
receiving, from the server, a first response comprising a matching result of the extracted video fingerprint and video fingerprints stored in the server;

based on the first response representing that the extracted video fingerprint matches a plurality of video fingerprints stored in the server and comprising information about a time period, among time periods constituting the extracted video fingerprint, in which the extracted video fingerprint matches the plurality of video fingerprints stored in the server, extracting an audio fingerprint with respect to the time period in which the extracted video fingerprint matches the plurality of video fingerprints based on the first response, from the audio data being output by an audio processing/output unit of the display device, transmitting the extracted audio fingerprint to the server, receiving, from the server, a second response comprising a matching result of the extracted audio fingerprint and audio fingerprints corresponding to the plurality of video fingerprints stored in the server and providing information about content of the selected channel being displayed on the display based on the second response; and based on the first response representing that the extracted video fingerprint matches one video fingerprint stored in the server and comprising information about the content of the selected channel being displayed on the display, providing the information about the content of the selected channel being displayed on the display based on the first response without extracting the audio fingerprint from the audio data being output by the audio processing/output unit of the display device.

6. The operating method of claim 5, wherein the matching result included in the second response is a matching result of the extracted audio fingerprint and each of audio fingerprints corresponding to a plurality of content items corresponding to the plurality of video fingerprints that match the extracted video fingerprint, among audio fingerprints stored in the server.

7. The operating method of claim 5, wherein the first response further comprises information about a content item corresponding to at least one video fingerprint that matches the extracted video fingerprint, and the second response further comprises information about a content item corresponding to a combination of the plurality of video fingerprints that match the extracted video fingerprint, and an audio fingerprint that matches the extracted audio fingerprint.

8. The operating method of claim 5, further comprising:

extracting the video fingerprint and the audio fingerprint from the content being displayed on the display at preset time intervals;

extracting the audio fingerprint from the content being displayed on the display, at preset time intervals, in case that the extracted video fingerprint matches the plurality of video fingerprints stored in the server according to the first response; and stopping the extraction of an audio fingerprint, in case that the extracted video fingerprint matches one video fingerprint stored in the server.

9. A computer program product comprising a non-transitory computer-readable recording medium having a computer readable program stored therein, wherein the computer readable program, when executed on a display device, causes the display device to:
receive a user input of selecting a channel;
display images of video data of the selected channel on a display of the display device;
process audio data of the selected channel and output the processed audio data;

in response to the user input of selecting the channel, extract a video fingerprint from the video data being displayed on the display of the display device;

transmit the extracted video fingerprint to a server;

receive, from the server, a first response comprising a matching result of the extracted video fingerprint and video fingerprints stored in the server;

based on the first response representing that the extracted video fingerprint matches a plurality of video fingerprints stored in the server and comprising information about a time period, among time periods constituting the extracted video fingerprint, in which the extracted video fingerprint matches the plurality of video fingerprints stored in the server, extract an audio fingerprint with respect to the time period in which the extracted video fingerprint matches the plurality of video fingerprints based on the first response, from the audio data being output by an audio processing/output unit of the display device, transmit the extracted audio fingerprint to the server, receive, from the server, a second response comprising a matching result of the extracted audio fingerprint and audio fingerprints corresponding to the plurality of video fingerprints stored in the server and provide information about content of the selected channel being displayed on the display based on the second response; and based on the first response representing that the extracted video fingerprint matches one video fingerprint stored in the server and comprising information about the content of the selected channel being displayed on the display, provide the information about the content of the selected channel being displayed on the display based on the first response without extracting the audio fingerprint from the audio data being output by the audio processing/output unit of the display device.

* * * * *